United States Patent
Milot

(12) 
(10) Patent No.: US 6,304,808 B1
(45) Date of Patent: Oct. 16, 2001

(54) ENHANCED ACTIVE BRAKE CONTROL SYSTEM FUNCTIONALITY THROUGH SYSTEM INTEGRATION WITH ADAPTIVE CRUISE CONTROL

(75) Inventor: Danny R. Milot, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/659,027

(22) Filed: Sep. 9, 2000

(51) Int. Cl.[7] .................................................... B60K 31/04
(52) U.S. Cl. ................................ 701/91; 701/93; 701/96; 180/169
(58) Field of Search .................................. 701/70, 71, 72, 701/78, 82, 83, 93, 96, 91; 123/319, 349, 350, 352; 180/169, 170–179

(56) References Cited

U.S. PATENT DOCUMENTS

| | | | |
|---|---|---|---|
| 4,987,357 | * 1/1991 | Masaki | 318/587 |
| 5,173,859 | * 12/1992 | Deering | 701/96 |
| 6,009,368 | * 12/1999 | Labahn et al. | 701/96 |
| 6,208,106 | * 3/2001 | Sielagoski et al. | 701/96 |
| 6,223,117 | * 4/2001 | Labahn et al. | 701/93 |
| 6,226,588 | * 5/2001 | Teramara et al. | 701/93 |

* cited by examiner

Primary Examiner—Richard M. Camby
(74) Attorney, Agent, or Firm—MacMillan, Sobanski & Todd, LLC

(57) ABSTRACT

A control system for controlling braking and ACC functions of a vehicle includes a braking algorithm. A first signal processor receives input signals from at least one sensor and transmits transfer signals to the braking algorithm. The control system also includes an ACC algorithm. A second signal processor receives input signals from at least one sensor and transmits transfer signals to the ACC algorithm. Transfer signals are generated by the braking algorithm and transmitted to the ACC algorithm. Transfer signals are generated by the ACC algorithm and transmitted to the braking algorithm. Output signals are generated by the braking algorithm and transmitted to a hydraulic control unit to control vehicular braking. Output signals are generated by the ACC algorithm and transmitted to ACC actuators.

1 Claim, 1 Drawing Sheet

ACC - VSC Context Diagram

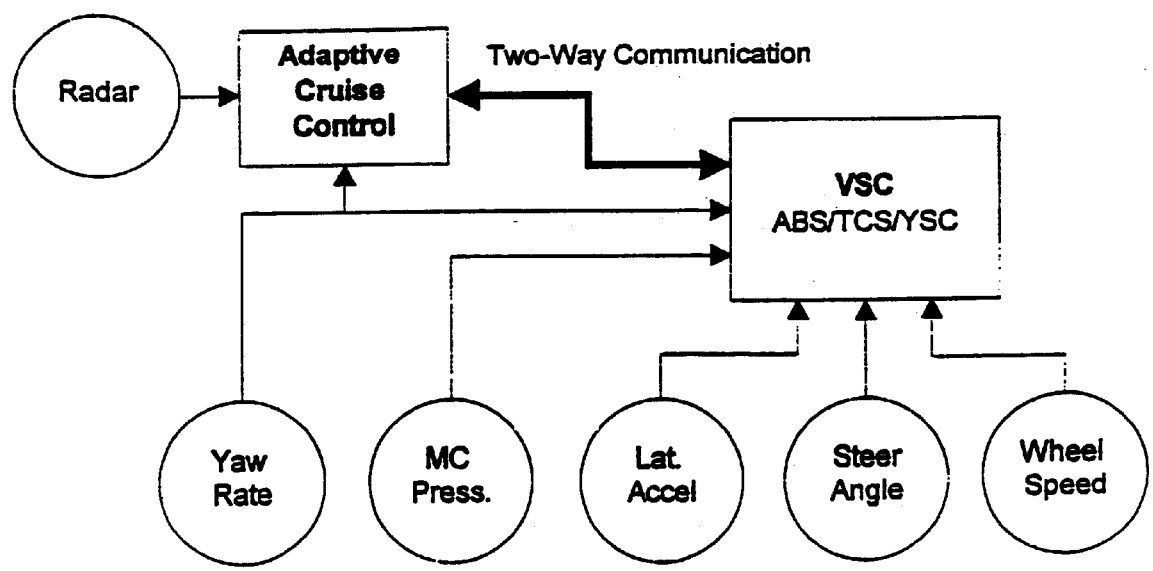
Figure 1: ACC - VSC Context Diagram

ENHANCED ACTIVE BRAKE CONTROL SYSTEM FUNCTIONALITY THROUGH SYSTEM INTEGRATION WITH ADAPTIVE CRUISE CONTROL

BACKGROUND OF THE INVENTION

This invention relates in general to electronically-controlled vehicular braking and suspension systems. In particular, this invention is concerned with vehicular control systems that integrate braking and ACC functions.

Electronically-controlled vehicular braking systems can include anti-lock braking (ABS), traction control (TC), and vehicle stability control (VSC) functions. In such braking systems, sensors deliver input signals to an electronic control unit (ECU). The ECU sends output signals to electrically activated devices to apply, hold, and dump (relieve) pressure at wheel brakes of a vehicle. Oftentimes, electrically activated valves and pumps are used to control fluid pressure at the wheel brakes. Such valves and pumps can be mounted in a hydraulic control unit (HCU). The valves can include two-state (on/off or off/on) solenoid valves and proportional valves.

SUMMARY OF THE INVENTION

This invention relates to electronically-controlled vehicular systems that integrate braking and ACC functions. Braking functions can include anti-lock braking, traction control, and vehicle stability control. An integrated control system according to this invention receives input signals, calculates a desired response with braking and ACC algorithms, and directs devices to perform the desired functions.

In a preferred embodiment, a control system for controlling braking and ACC functions of a vehicle includes a braking algorithm. A first signal processor receives input signals from at least one sensor and transmits transfer signals to the braking algorithm. The control system also includes an ACC algorithm. A second signal processor receives input signals from at least one sensor and transmits transfer signals to the ACC algorithm. Transfer signals are generated by the braking algorithm and transmitted to the ACC algorithm. Transfer signals are generated by the ACC algorithm and transmitted to the braking algorithm. Output signals are generated by the braking algorithm and transmitted to a hydraulic control unit to control vehicular braking. Output signals are generated by the ACC algorithm and transmitted to an ACC actuator.

In other embodiments of an integrated control system, only the braking algorithm transfers signals to the ACC algorithm. In yet other embodiments, only the ACC algorithm transfers signals to the braking algorithm.

The following defines the three primary points of the invention that are considered to be new:
  ACC system provides vehicle ground speed information to VSC system for enhanced active braking control.
  Communication between the ACC and VSC systems provides a means for modifying the ACC system settings due to potential adverse road conditions. ACC actuation may activate either ABS or TCS requiring either an increase in headway distance or less aggressive acceleration or deactivation. If YSC activates during ACC operation, then the ACC system settings should also be modified to take into account the potential for unsafe operating conditions.
  Vehicle side slip estimation for YSC can be enhanced by using the ACC vehicle speed measurement and vehicle yaw rate sensor information.

These three main points improve over the existing products because currently the two systems, ACC and VSC, operate independently even though the potential exists for the ACC system to activate either ABS or TCS. With the two systems communicating with one another, information about vehicle stability or operating condition can be shared in order to provide a safer system.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a schematic diagram of an integrated vehicular braking and ACC control system according to the present invention.

DETAILED DESCRIPTION OF THE PREFERRED EMBODIMENTS

A first embodiment of a vehicular control system according to the present invention is indicated generally in FIG. 1. The control system is particularly adapted to control fluid pressure in an electronically-controlled vehicular braking system and an electronically-controlled ACC system. The braking system can include anti-lock braking, traction control, and vehicle stability control functions.

The following terms may be used throughout this description:
  ACC—Adaptive Cruise Control
  ABS—Anti-lock Braking System
  TCS—Traction Control System
  YSC—Yaw Stability Control
  VSC—Vehicle Stability Control (comprised of ABS/TCS/YSC)
  EHB—Electrohydraulic Braking The largest benefit of interfacing the ACC system with an active brake control system is the capability of the ACC sensing system (traditionally either a radar or infrared technology based device) to provide true vehicle ground speed. The ACC system also contains a vehicle yaw rate sensor that either provides new information for systems such as ABS or TCS or shared information for a system such as YSC. Vehicle yaw rate information is useful in determining vehicle turning during limit handling conditions.

True vehicle ground speed is something that is virtually impossible to measure via the wheel speeds. Braking torque, acceleration (drive) torque, and ground resistance are examples of external forces that affect the wheel speed from accurately measuring the vehicle speed. With an accurate measurement of vehicle speed a more precise estimation of wheel slip can be computed. With a better estimation of wheel slip, systems such as ABS, TCS and YSC can be significantly improved. The base brake algorithm of EHB also uses vehicle speed to compute a pressure command for each of the wheels. Hence a more accurate estimation of vehicle speed potentially could provide more effective braking for variable vehicle speeds. FIG. 1 illustrates the two basic systems and the sensors available to each vehicle control system.

ACC assumes that relatively good driving conditions exist during system operation (i.e. high surface coefficient of friction). ABS and TCS generally only activate during conditions of wheel instability (i.e. excessive wheel slip due to braking or accelerating beyond the limit of the surface). YSC activates when it is determined that the vehicle is not following the intended trajectory during a turning maneuver. If ABS, TCS or YSC activates during ACC operation, then communication between the two systems (ACC-VSC) is required to either deactivate or significantly modify the operation of the ACC system.

ACC is designed to decelerate the vehicle up to a maximum of 3 m/sec$^2$ (0.3 g) and accelerate the vehicle up to approximately 2 m/sec$^2$ (o.2 g) in order to properly control the vehicle spacing. In the event the ACC is operational while the vehicle is traversing adverse road conditions, the ABS and TCS systems may provide assistance with vehicle stability. If either the ABS or TCS system activates because of an actuation command from the ACC system, then the ACC system is notified to reduced its current acceleration request or modify its headway distance command for safer driving distances. If ABS activity is enabled during an ACC braking event, then the ACC system must maintain its braking command to control the vehicle spacing, however, the desired headway distance is modified to maintain safer spacing for the given road conditions.

In the event that ACC is enabled and the driver activates YSC during a turning maneuver, then the headway setting for the ACC system must be modified to ensure safer spacing due to the adverse road conditions.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle control system comprising:

an adaptive cruise control (ACC) adapted to control the speed of a vehicle along a path while maintaining a safe operating distance from another vehicle or object located in said path ahead of the vehicle in accordance with predetermined operating parameters;

a braking control system operable in at least two of a plurality of operating states including anti-lock brake control, traction control and yaw stability control in order to enhance the braking, traction, and stability characteristic of the vehicle;

modifying one or more of the predetermined operating parameters of the ACC system as a function of the specific operating state of the brake control system.

* * * * *